(12) United States Patent
Chowdhury

(10) Patent No.: US 6,755,153 B1
(45) Date of Patent: Jun. 29, 2004

(54) TEATCUP LINER MOUTHPIECE LIP WITH CONTROLLED DEFLECTION AND SLIP REDUCTION

(76) Inventor: Mofazzal H. Chowdhury, 1301 Baitinger Ct., Sun Prairie, WI (US) 53590-1550

( * ) Notice: Subject to any disclaimer, the term of this patent is extended or adjusted under 35 U.S.C. 154(b) by 0 days.

(21) Appl. No.: 10/359,848

(22) Filed: Feb. 7, 2003

Related U.S. Application Data
(60) Provisional application No. 60/355,103, filed on Feb. 8, 2002.

(51) Int. Cl.[7] .................................................. A01J 5/06
(52) U.S. Cl. ........................................................ 119/14.47
(58) Field of Search ........................... 119/14.47, 14.48, 119/14.49, 14.5, 14.51, 14.52, 14.53, 14.24, 14.27

(56) References Cited

U.S. PATENT DOCUMENTS

| | | | |
|---|---|---|---|
| 2,649,073 A | * 8/1953 | Smith | |
| 3,096,740 A | 7/1963 | Noorlander | 119/14.52 |
| 3,289,634 A | 12/1966 | Simons | 119/14.52 |
| 3,474,760 A | * 10/1969 | Siddall et al. | 119/14.49 |
| 3,659,557 A | * 5/1972 | Noorlander | 119/14.36 |
| 3,659,558 A | 5/1972 | Noorlander | 119/14.52 |
| 3,967,587 A | 7/1976 | Noorlander | 119/14.49 |
| 4,269,143 A | 5/1981 | Erbach | 119/14.49 |
| 4,372,250 A | * 2/1983 | Larson | 119/14.47 |
| 4,530,307 A | 7/1985 | Thompson | 119/14.49 |
| 4,537,152 A | 8/1985 | Thompson | 119/14.54 |
| 4,610,220 A | 9/1986 | Goldberg et al. | 119/14.47 |
| 5,178,095 A | 1/1993 | Mein | 119/14.47 |
| 5,218,924 A | 6/1993 | Thompson et al. | 119/14.02 |
| 5,291,853 A | 3/1994 | Steingraber et al. | 119/14.54 |
| 5,482,004 A | 1/1996 | Chowdhury | 119/14.52 |
| 5,493,995 A | 2/1996 | Chowdhury | 119/14.54 |
| 5,752,462 A | 5/1998 | Petersson | 119/14.47 |
| 5,857,424 A | * 1/1999 | Johnston | 119/14.47 |
| 6,039,001 A | 3/2000 | Sanford | 119/14.47 |
| 6,055,931 A | 5/2000 | Sanford, Jr. | 119/14.36 |
| 6,202,593 B1 | * 3/2001 | Maier et al. | 119/14.47 |
| 6,308,656 B1 | 10/2001 | Milbrath et al. | 119/14.47 |
| 6,435,132 B1 | 8/2002 | Milbrath et al. | 119/14.47 |
| 2003/0051669 A1 | * 3/2003 | Petersson | 119/14.47 |

FOREIGN PATENT DOCUMENTS

| | | |
|---|---|---|
| GB | 2179231 | * 3/1987 |

* cited by examiner

*Primary Examiner*—Yvonne R. Abbott
(74) *Attorney, Agent, or Firm*—Andrus, Sceales, Starke & Sawall, LLC (57) ABSTRACT

The lip of the upper mouthpiece of a teatcup liner is provided with controlled deflection for controlling slip along the teat of the mammal being milked. The deflection control is provided by various embossed patterns and/or inserts.

28 Claims, 8 Drawing Sheets

FIG. 24

TEATCUP LINER MOUTHPIECE LIP WITH CONTROLLED DEFLECTION AND SLIP REDUCTION

CROSS-REFERENCE TO RELATED APPLICATION

This application claims priority from Provisional U.S. patent application Ser. No. 60/355,103, filed Feb. 8, 2002.

BACKGROUND AND SUMMARY

The invention relates to teatcup liners for use in a teatcup assembly for milking a mammal, and more particularly to the mouthpiece liner lip, and further particularly to controlled deflection of such lip and reduction of slip thereof along the teat As known in the prior art, a plurality of teatcups are connected to respective teats suspending from the udder of a mammal such as a cow. Each teatcup assembly has a teatcup liner or inflation around a respective teat and defining a milk flow passage within the liner below the teat, and a pulsation chamber outside the liner between the liner and the teatcup shell, for example U.S. Pat. Nos. 4,269,143, 4,530,307, 5,178,095, 5,218,924, 6,055,931, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The present invention arose during continuing development efforts relating to teatcup liners. The invention provides controlled deflection and reinforcement of the teatcup liner mouthpiece lip, and reduction of slip thereof along the teat.

DETAILED DESCRIPTION

Figure 1:
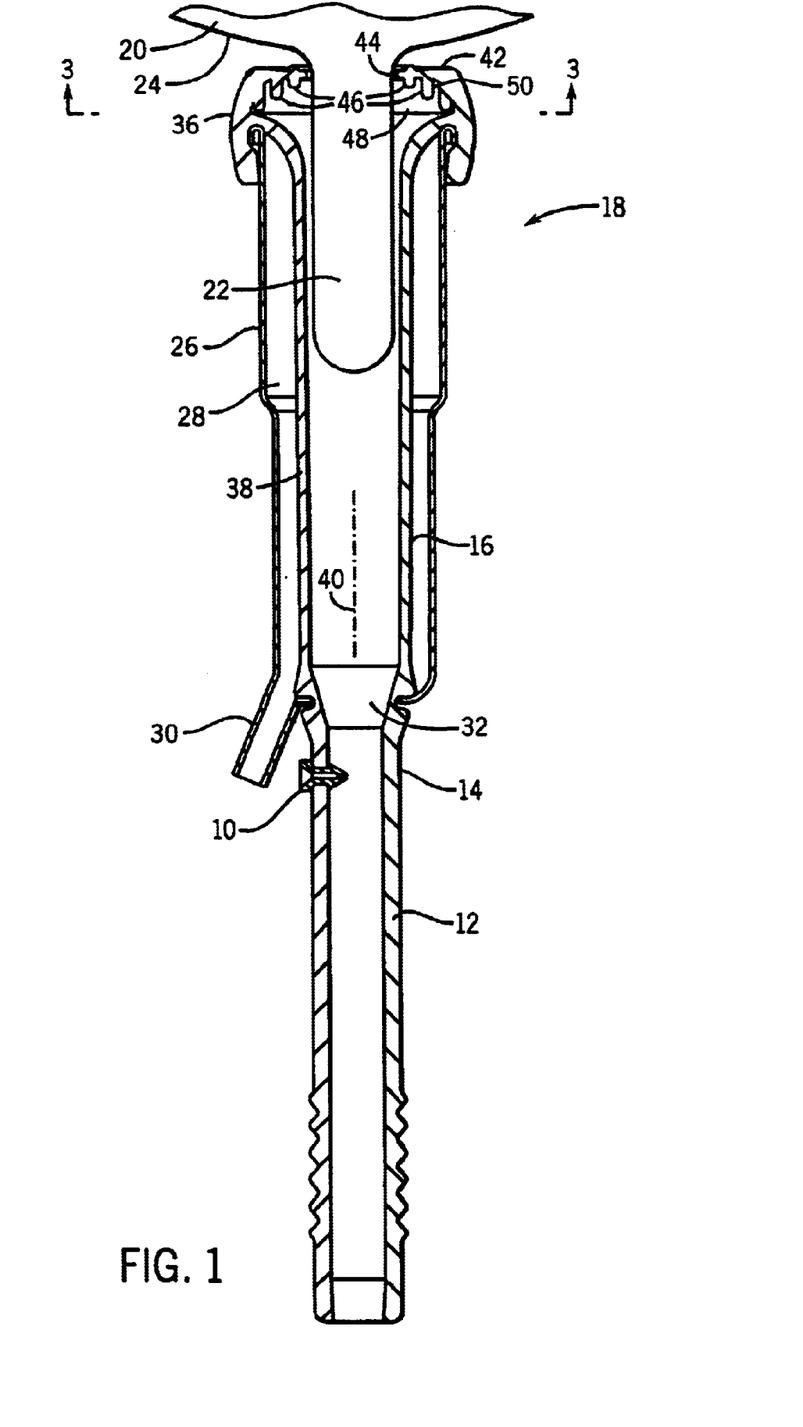
FIG. 1 is like FIG. 1 of U.S. Pat. No. 6,055,931 modified according to present invention, and is a side view partially in section of a teatcup assembly including a teatcup finer for milking a mammal.
Figure 2:
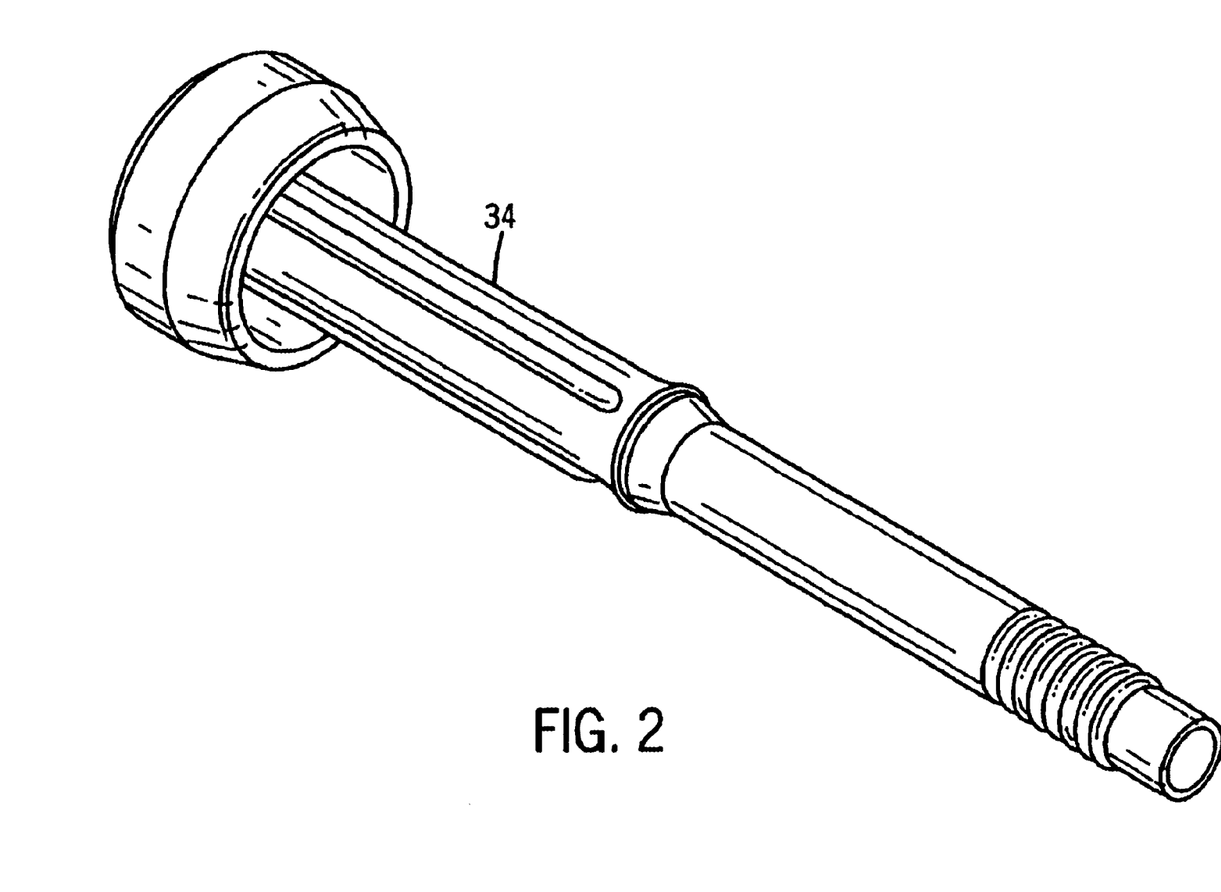
FIG. 2 is an isometric view of a teatcup liner.

FIG. 1 shows a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connection to a claw, for example U.S. Pat. Nos. 4,537,152 and 5,291,853, incorporated herein by reference, which in turn supplies milk to a storage vessel. As noted above, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents. An air vent plug 10 may be inserted through the wall 12 of the milk tube portion 14 of the teat liner, as is known, for example above noted incorporated U.S. Pat. No. 6,055,931. For further background, a teatcup liner is illustrated in isometric view at 34 in FIG. 2.

Figure 3:
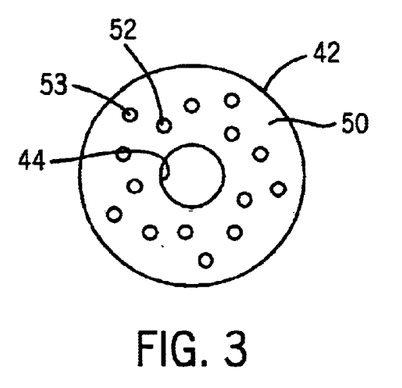
FIG. 3 is a view taken along line 3—3 of FIG. 1.
Figure 4:
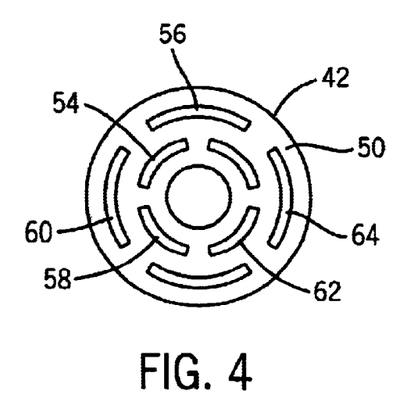
FIG. 4 is like FIG. 3 and shows another embodiment.

In one embodiment, deflection controller 46 is integrally formed along lip 42. Mouthpiece 36 has a cavity 48 between lip 42 and barrel 38. Lip 42 has an inner surface 50 facing cavity 48. Deflection controller 46 is preferably on inner surface 50 of lip 42 and faces cavity 48. In one embodiment, the deflection controller is an embossed pattern on the lip. The pattern is along an annulus around lip aperture 44, and is a raised pattern protruding downwardly axially into cavity 48. In one embodiment, FIG. 3, the pattern is a plurality of dots 52. FIG. 3 is a sectional view taken along line 3—3 of FIG. 1 looking upwardly at and providing an elevation view from below of inner surface 50 of lip 42 including raised dots 52, 53, etc. of the embossed pattern of deflection controller 46 protruding axially downwardly into cavity 48. In another embodiment, the noted pattern is a plurality of arcuately elongated ribs 54, 56, etc. The ribs are circumferentially distributed around aperture 44 in multiple layers such as 58 and 60, each layer having a plurality of ribs. In FIG. 4, at least portions of the ribs in layer 58, for example portion 62, are non-radially-aligned with portions of the ribs in layer 60, for example as shown at 64, to provide offset ribs from layer 58 to layer 60. In another embodiment, FIG. 5, ribs 66 in layer 70 are radially aligned with ribs 72 in layer 74. These embossed patterns provide a first ring or band such as 58 or 70 of a plurality of circumferentially spaced arcuate ribs such as 54 or 66, and a second ring or band such as 60 or 74 of a plurality of circumferentially spaced arcuate ribs such as 56 or 72. FIG. 6 shows a further embodiment wherein the pattern is provided by a plurality of rings such as 76, 78 circumscribing aperture 44. In a further embodiment, FIG. 7, the pattern is a continuous spiral rib 80 around aperture 44. In another embodiment, FIG. 8, the pattern is an annular ring 82 around aperture 44, with the ring having a plurality of radial protrusions 84 extending radially therefrom. In a further embodiment, FIG. 9, the pattern is a ring 86 around aperture 44 and having a circumferential wave shape with a set of valleys 88 radially spaced from aperture 44 by a first radial distance 90, and a set of peaks 92 alternating with valleys 88 and radially spaced from aperture 44 by a second radial distance 94 greater than the noted first radial distance 90. Multiple wave shaped rings may be provided if desired.

Figure 5:
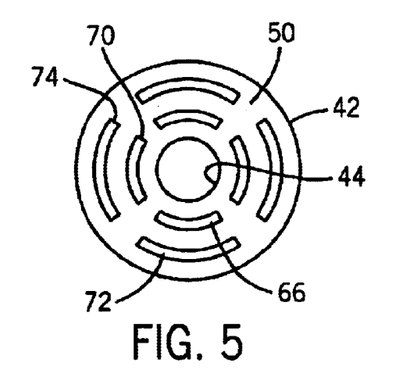
FIG. 5 is like FIG. 3 and shows another embodiment.
Figure 6:
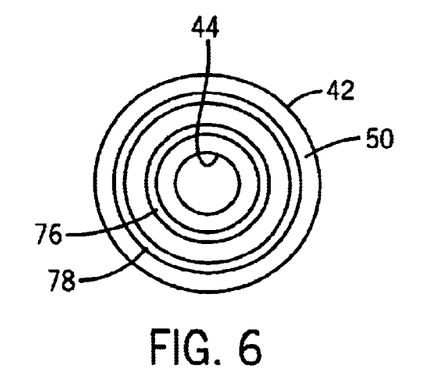
FIG. 6 is like FIG. 3 and shows another embodiment.
Figures 7, 8, 9, 10:
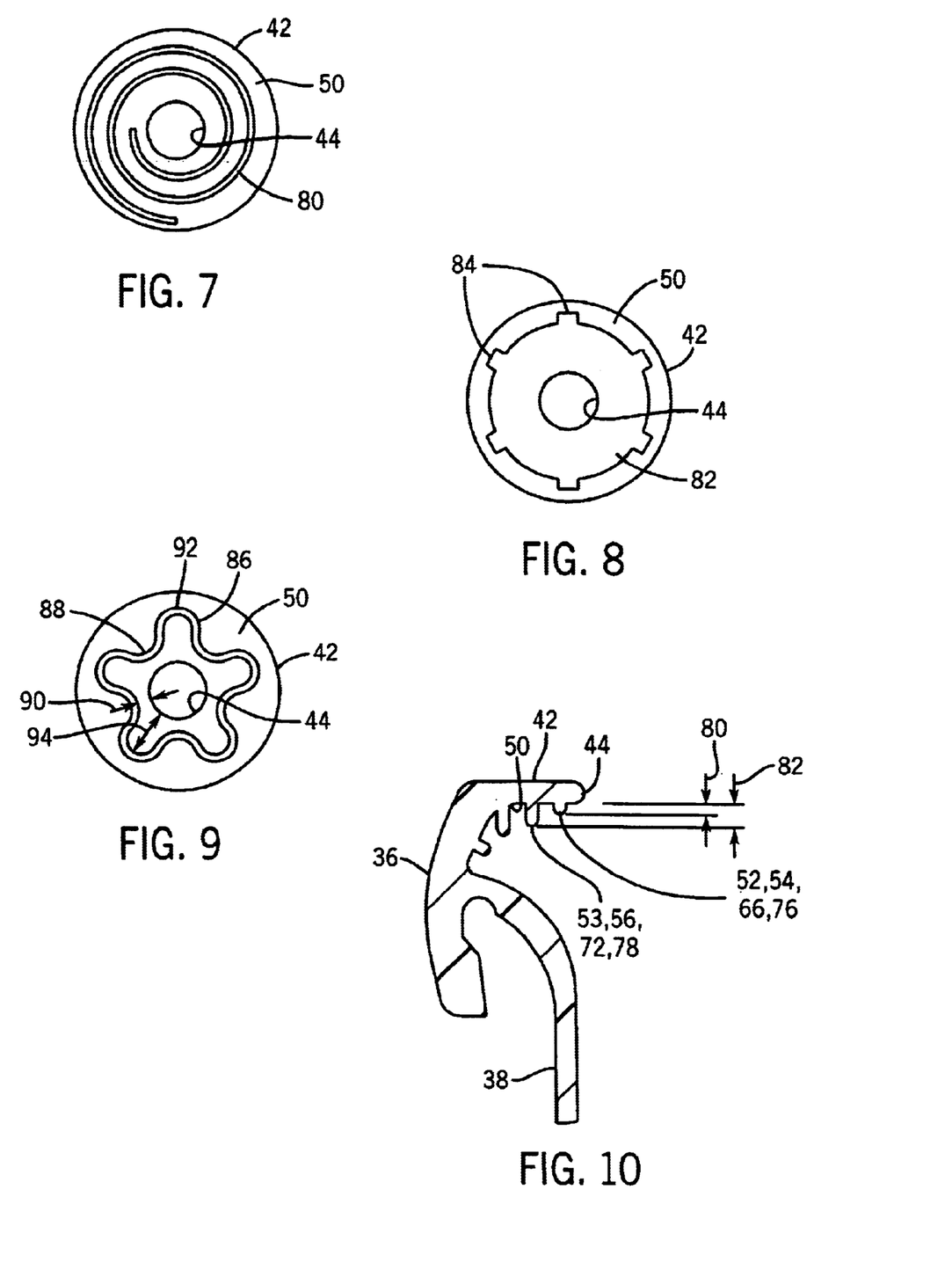
FIG. 7 is like FIG. 3 and shows another embodiment.
FIG. 8 is like FIG. 3 and shows another embodiment.
FIG. 9 is like FIG. 3 and shows another embodiment.
FIG. 10 is a view of a portion of FIG. 1.
Figure 11:
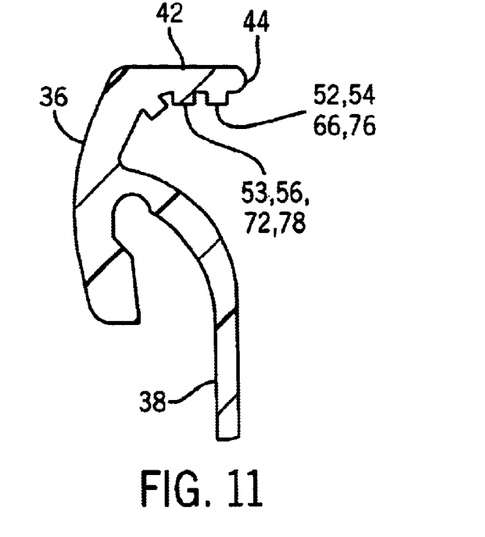
FIG. 11 is like FIG. 10 and shows another embodiment.

In the embodiments noted above, the patterns have a plurality of segments radially spaced from each other, FIG. 10, for example segments 52 and 53 of FIG. 3, segments 54 and 56 of FIG. 4, segments 66 and 72 of FIG. 5, segments 76 and 78 of FIG. 6, and so on. The segments have an axial thickness 80 measured parallel to axis 40. In a further embodiment, such axial thickness varies segment to segment, for example, axial thickness 80 of segments 52, 54, 66, 76, etc. is less than axial thickness 82 of segments 53, 56, 72, 78. The noted axial thickness increases as the segments are spaced farther from aperture 44, such that the smallest axial thickness segment is the segment closest to aperture 44, and the greatest axial thickness segment is the segment farthest from aperture 44, for example: in FIG. 3, the axial thickness or height of segment 53 is greater than that of segment 52; in FIG. 4, the axial thickness or height of segment 56 is greater than that of segment 54; in FIG. 5, the axial thickness or height of segment 72 is greater than that of segment 66; in FIG. 6, the axial thickness or height of segment 78 is greater than that of segment 76. The shape of the segments may be rounded in lateral cross-section as shown in FIG. 10, or may have other cross-sectional shapes, such as rectangular, FIG. 11, or other shapes.

Figure 12:
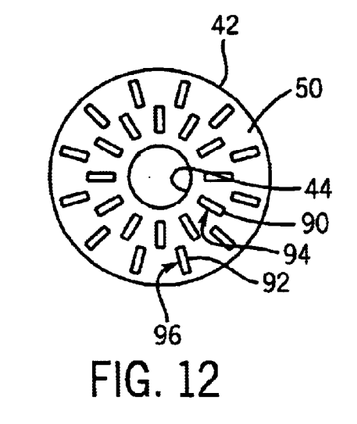
FIG. 12 is like FIG. 3 and shows another embodiment.
Figure 13:
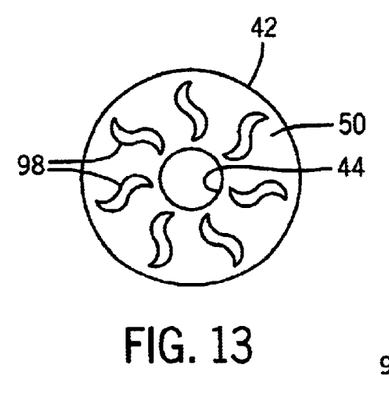
FIG. 13 is like FIG. 3 and shows another embodiment.
Figure 14:
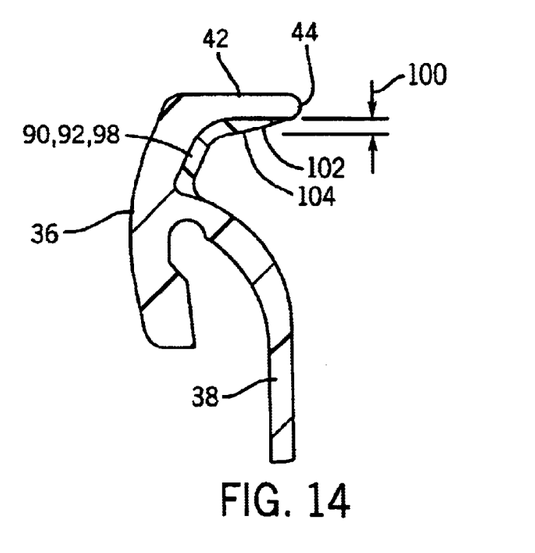
FIG. 14 is like FIG. 10 and shows another embodiment.

In a further embodiment, FIG. 12, the noted pattern is provided by a plurality of radially elongated ribs such as 90 and 92. In one embodiment, such pattern includes a first ring or band 94 of a plurality of circumferentially spaced radial ribs 90, and a second ring or band 96 of a plurality of circumferentially spaced radial ribs 92. In another embodiment, FIG. 13, the pattern is provided by a plurality of ribs 98 extending radially outwardly from aperture 44 in a wave pattern. In a further embodiment, ribs 90 and/or 92 of FIG. 12, or ribs 98 of FIG. 13, have an axial thickness 100, FIG. 14, measured parallel to axis 40, which axial thickness varies as the ribs extend radially relative to axis 40. In such embodiment, it is preferred that axial thickness 100 increases as the ribs extend radially outwardly from aperture 44. For example the axial thickness increases as the ribs extend radially outwardly from portion 102 to portion 104, i.e. the axial thickness at 104 is greater than the axial thickness at 102.

Figure 15:
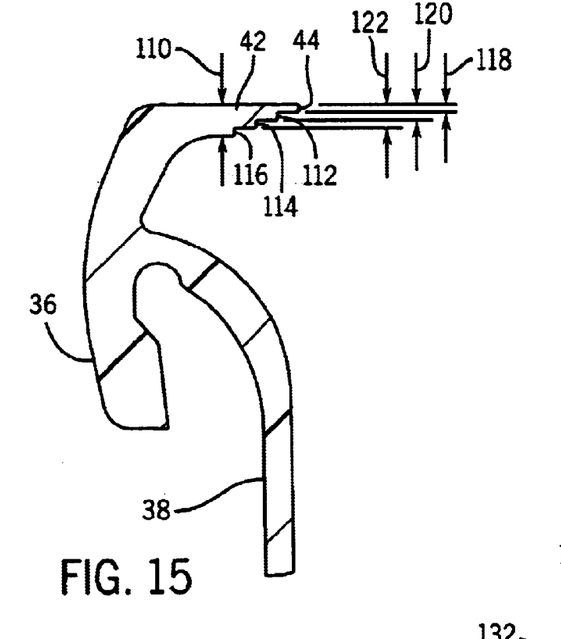
FIG. 15 is like FIG. 10 and shows another embodiment.

Lip 42 has an axial thickness 110, FIG. 15, measured parallel to axis 40. In a further embodiment, the noted pattern is provided by a plurality of annular steps 112, 114, 116 varying the noted axial thickness of lip 42 as the lip extends radially outwardly (leftwardly in FIG. 15) from aperture 44. Further in this embodiment in preferred form, the noted pattern includes first step 112 spaced radially outwardly of aperture 44 and changing the axial thickness of lip 42 from a first axial thickness 118 to a second axial thickness 120, and a second step 114 spaced radially outwardly of first step 112 and changing the axial thickness of lip 42 from the noted second axial thickness 120 to a third axial thickness 122, wherein the noted third axial thickness 122 is greater than the noted second axial thickness 120, and the noted second axial thickness 120 is greater than the noted first axial thickness 118, and so on.

Figure 16:
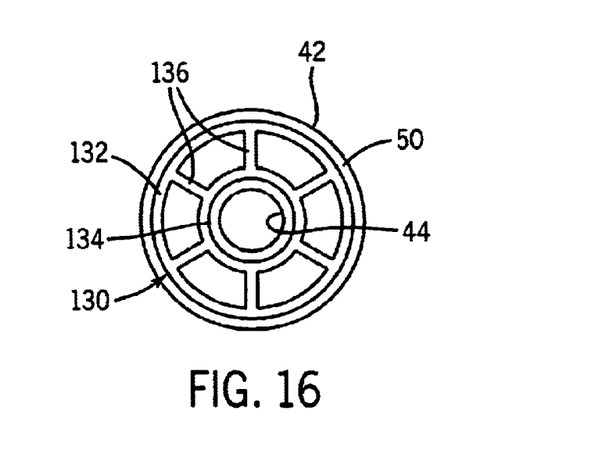
FIG. 16 is like FIG. 3 and shows another embodiment.
Figure 17:
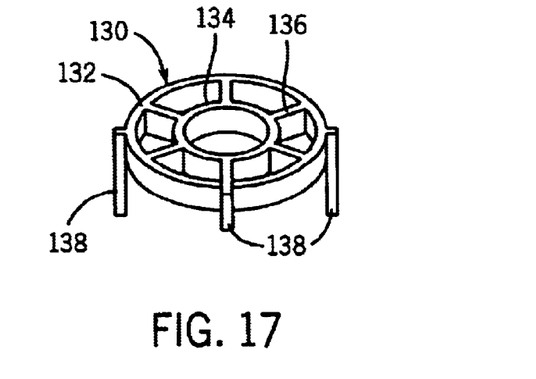
FIG. 17 is a perspective view of the structure of FIG. 16.
Figure 18:
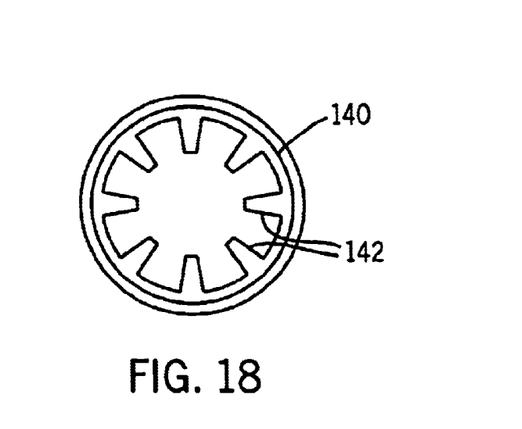
FIG. 18 is like FIG. 16 and shows another embodiment.
Figure 19:
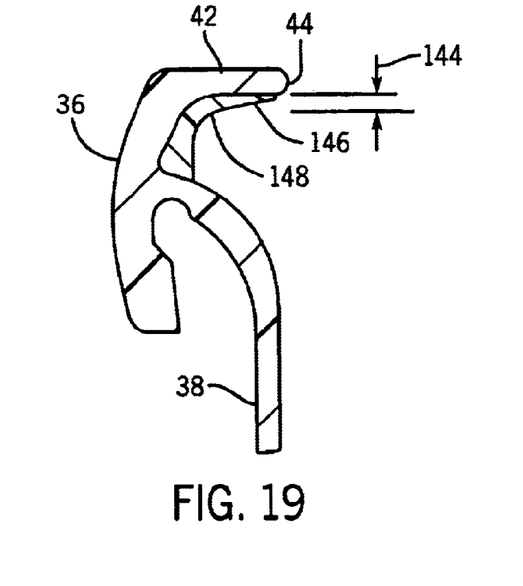
FIG. 19 is like FIG. 10 and shows another embodiment.

In another embodiment, the noted deflection controller is an insert 130, FIG. 16, extending along lip 42, preferably around the annulus of such lip along inner surface 50 around aperture 44. Insert 130 includes an outer ring 132 connected to an inner ring 134 by a plurality of radial spokes 136. Outer ring 132 may include plurality of axially and/or radially extending legs 138, FIG. 17, extending therefrom for anchoring insert 130 in cavity 48. In a further embodiment, FIG. 18, inner ring 134 is eliminated, and the insert includes only an outer ring 140 and a plurality of radial spokes 142 extending radially inwardly therefrom. The spokes 142 or 136 of the insert have an axial thickness 144, FIG. 19, measured parallel to axis 40. In a further embodiment, the axial thickness of the spokes varies as the spokes extend radially. In the preferred form of such embodiment, the noted axial thickness decreases as the spokes extend radially inwardly (rightwardly in FIG. 19) from outer ring 132 or 140, for example the axial thickness of the spokes at 146 is less than the axial thickness of the spokes at 148.

Figure 20:
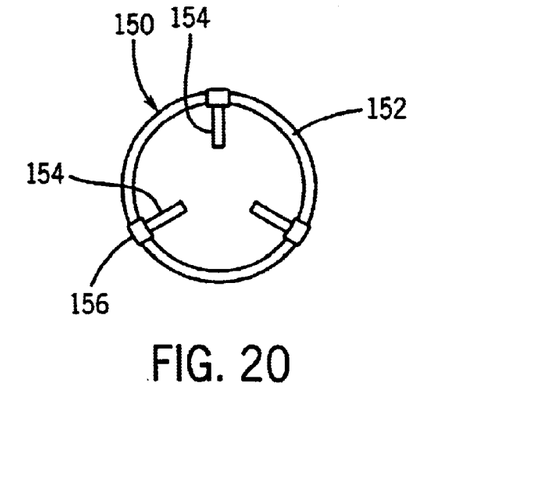
FIG. 20 is like FIG. 16 and shows another embodiment.
Figure 21:
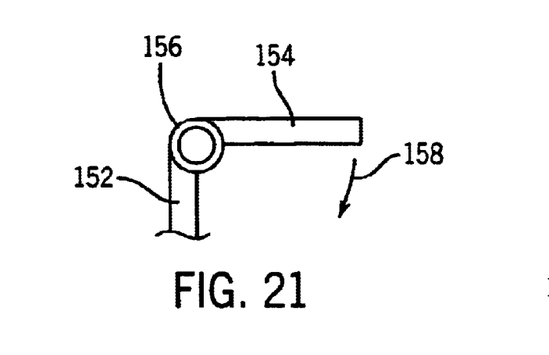
FIG. 21 is a side view of the structure of FIG. 20.

In another embodiment, FIGS. 20, 21 and insert 150 has an outer ring 152 with radial spokes 154 hinged at 156 to outer ring 152 for axial deflection therefrom as shown at arrow 158. Spokes 154 are resiliently hinged to outer ring 152 at a biased pivot 156, preferably a spring hinge, to resiliently resist deflection of lip 42 at aperture 44.

Figure 22:
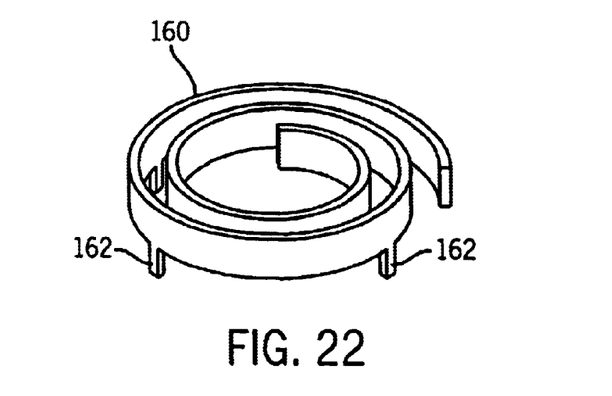
FIG. 22 is like FIG. 16 and shows another embodiment.

In another embodiment, FIG. 22, the noted insert is a spiral 160 around lip aperture 44. The spiral may have a plurality of legs 162 extending axially and/or radially therefrom for anchoring the insert in cavity 48. In preferred form, the spiral is a resilient spring.

Figure 23:
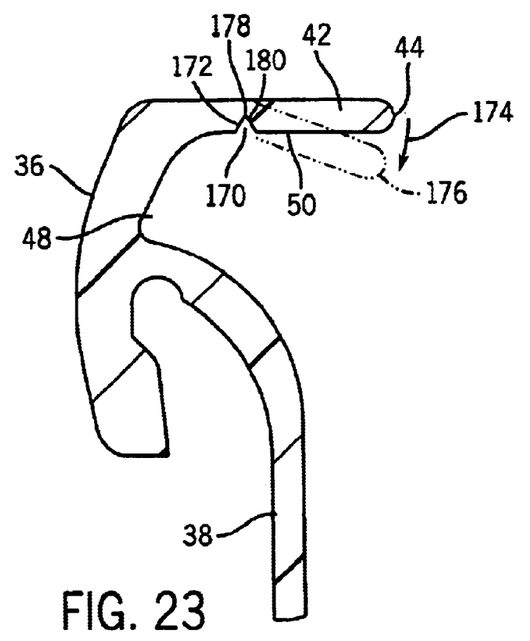
FIG. 23 is like FIG. 10 and shows another embodiment.
Figure 24:
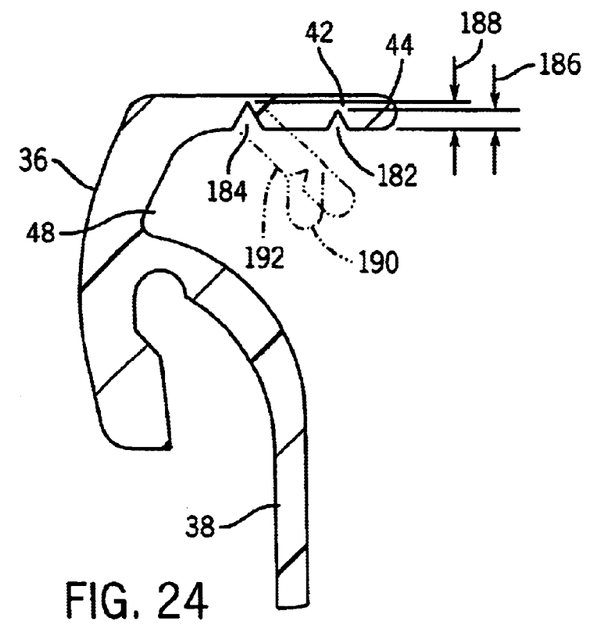
FIG. 24 is like FIG. 23 and shows another embodiment.

In a further embodiment, one or more notches 170, FIG. 23, are provided along the annulus along lip 42 around aperture 44 and provide an inflection point 172 for controlled axial deflection of lip 42 at aperture 44 as shown at arrow 174 to the dashed line deflected position 176 of lip 42. Notch 170 preferably annularly circumscribes lip aperture 44 and is a continuous circle therearound. Notch 170 is in lip inner surface 50 and concavely faces cavity 48. The notch is a V-shaped annulus with the apex 178 of the V facing upwardly away from cavity 48, and the sides 180 of the V extending downwardly from apex 178 toward cavity 48. In a further embodiment, two radially spaced circumferential notches 182, 184, FIG. 24, extend along the annulus of lip 42 around aperture 44. The notches have an axial height measured parallel to axis 40, and the axial height 186 of notch 182 is less than the axial height 188 of notch 184. This provides two inflection points for axial deflection of lip 42, and compound deflection as shown in dashed line at 190 and 192 for compound deflection of lip 42.

It is recognized that various equivalents, alternatives and modifications are possible within the scope of the appended claims.

What is claimed is:

1. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, said pattern comprises a plurality of elongated ribs, and said ribs are arcuately elongated ribs.

2. The teatcup liner according to claim 1 wherein said arcuately elongated ribs are circumferentially distributed around said aperture in multiple layers, each layer having a plurality of ribs.

3. The teatcup liner according to claim 2 wherein at least portions of said ribs in one layer are non-radially-aligned with portions of ribs in another layer, to provide offset ribs from layer to layer.

4. The teatcup liner according to claim 2 wherein ribs in one layer are radially aligned with ribs in another layer.

5. The teatcup liner according to claim 1 wherein said pattern comprises a first ring of a plurality of circumferentially spaced arcuate ribs, and a second ring of a plurality of circumferentially spaced arcuate ribs.

6. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, and said pattern comprises a plurality of rings circumscribing said aperture.

7. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat wherein said deflection controller is integrally formed along said lip, said deflection controller comprises an embossed pattern on said lip, said pattern is along an annulus around said lip aperture, and said pattern comprises a continuous spiral rib around said aperture.

8. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, and said pattern comprises a ring around said aperture and having a circumferential wave shape with a set of valleys radially spaced from said aperture by a first radial distance, and a set of peaks alternating with said valleys and radially spaced from said aperture by a second radial distance greater than said first radial distance.

9. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, and said pattern comprises a plurality of segments radially spaced from each other and having an axial thickness measured parallel to said axis, and wherein said axial thickness varies segment to segment.

10. The teatcup liner according to claim 9 wherein said axial thickness increases as said segments are spaced farther from said aperture, such that a segment closer to said aperture has a smaller axial thickness than a segment farther from said aperture.

11. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, said pattern comprises a plurality of radially elongated ribs, and said pattern comprises a first ring of a plurality of circumferentially spaced radial ribs, and a second ring of a plurality of circumferentially spaced radial ribs.

12. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, said pattern comprises a plurality of radially elongated ribs, and said pattern comprises a plurality of ribs extending radially outwardly from said aperture in a wave pattern.

13. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, said pattern comprises a plurality of radially elongated ribs, and said ribs have an axial thickness measured parallel to said axis, and wherein said axial thickness varies as said ribs extend radially relative to said axis.

14. The teatcup liner according to claim 13 wherein said axial thickness increases as said ribs extend radially outwardly from said aperture.

15. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller is integrally formed along said lip, said deflection controller comprises an embossed pattern on said lip, said pattern is along an annulus around said lip aperture, and said lip has an axial thickness measured parallel to said axis, and wherein said pattern comprises a plurality of annular steps varying said axial thickness of said lip as it extends radially outwardly from said aperture.

16. The teatcup liner according to claim 15 comprising a first step spaced radially outwardly of said aperture and changing said axial thickness of said lip from a first axial thickness to a second axial thickness, a second step spaced radially outwardly of said first step and changing said axial thickness of said lip from said second axial thickness to a third axial thickness, wherein said third axial thickness is greater than said second axial thickness, and said second axial thickness is greater than said first axial thickness.

17. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller comprises an insert extending along said lip, said lip comprises an annulus around said lip aperture, and said insert extends along said annulus, and said insert comprises an outer ring connected to an inner ring by a plurality of radial spokes.

18. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller comprises an insert extending along said lip, said lip comprises an annulus around said lip aperture, and said insert extends along said annulus, and said insert comprises an outer ring having a plurality of radial spokes extending radially inwardly therefrom.

19. The teatcup liner according to claim 18 wherein said lip and said insert have an axial thickness measured parallel to said axis, and said spokes of said insert have an axial thickness which varies as said spokes extend radially.

20. The teatcup liner according to claim 19 wherein said axial thickness decreases as said spokes extend radially inwardly from said outer ring.

21. The teatcup liner according to claim 18 wherein said radial spokes are hinged to said outer ring for axial deflection therefrom.

22. The teatcup liner according to claim 21 wherein said spokes are resiliently hinged to said outer ring at a biased pivot to resiliently resist deflection of said lip.

23. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, a deflection controller along said lip controlling axial deflection of said lip at said aperture to control slip along said teat, wherein said deflection controller comprises an insert extending along said lip, said lip comprises an annulus around said lip aperture, and said insert extends along said annulus, and said insert comprises a spiral around said lip aperture.

24. The teatcup liner according to claim 23 wherein said mouthpiece has a cavity between said lip and said barrel, and said spiral has a plurality of legs extending therefrom for anchoring said insert in said cavity.

25. The teatcup liner according to claim 23 wherein said spiral is a resilient spring.

26. A teatcup liner comprising an upper mouthpiece and a barrel depending downwardly from said upper mouthpiece, said barrel extending axially along an axis for receiving a teat inserted axially thereinto through said mouthpiece, said mouthpiece having an upper lip having an aperture therethrough for receiving said teat, said lip comprises an annulus around said lip aperture, and comprising one or more notches along said annulus providing an inflection point for controled axial deflection of said lip at said aperture, and comprising two radially spaced circumference said notches along said annulus.

27. The teatcup liner according to claim 26 wherein said notches have an axial height measured parallel to said axis, and said axial height varies notch to notch.

28. The teatcup liner according to claim 26 wherein said two notches provide two inflection points providing compound deflection of said lip at said aperture.

* * * * *